S. WIEBE.
MIXING AND MEASURING APPARATUS.
APPLICATION FILED JAN. 15, 1910.
1,060,804.
Patented May 6, 1913.
2 SHEETS—SHEET 2.
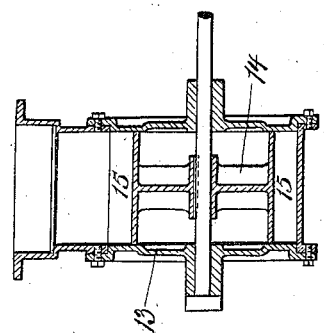
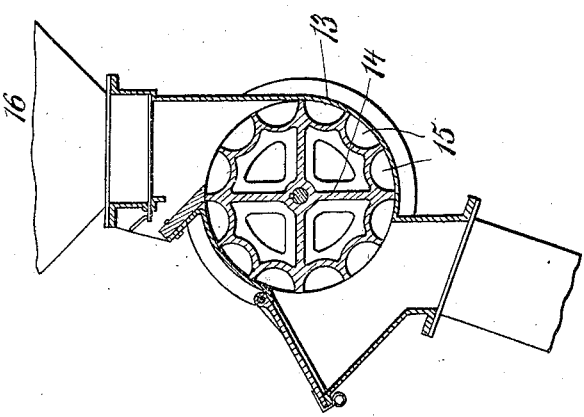
WITNESSES:
INVENTOR
Sigurd Wiebe
BY
his ATTORNEYS

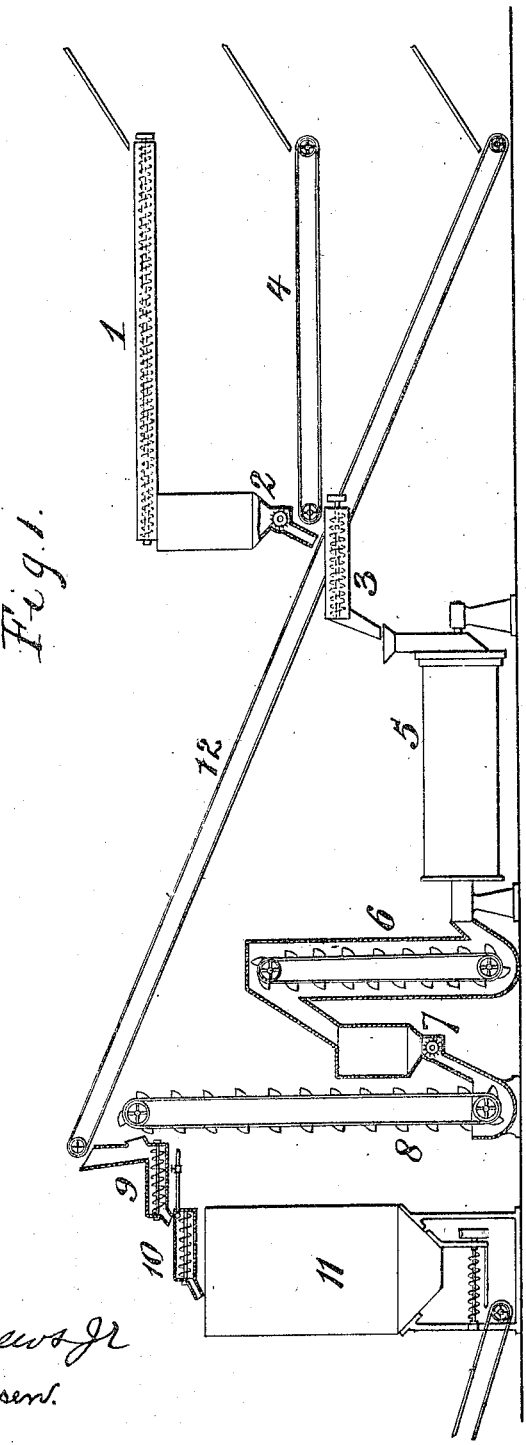

UNITED STATES PATENT OFFICE.

SIGURD WIEBE, OF BROOKLYN, NEW YORK, ASSIGNOR, BY MESNE ASSIGNMENTS, TO M. C. HATHAWAY, OF RICHMOND, VIRGINIA.

MIXING AND MEASURING APPARATUS.

1,060,804. Specification of Letters Patent. Patented May 6, 1913.

Application filed January 15, 1910. Serial No. 538,229.

*To all whom it may concern:*

Be it known that I, SIGURD WIEBE, a subject of the Crown of Sweden, and a resident of Brooklyn, county of Kings, and State of New York, have invented certain new and useful Improvements in Mixing and Measuring Apparatus, of which the following is a specification, reference being had to the accompanying drawings, forming a part thereof.

My invention relates particularly to mixing and measuring devices suitable for properly proportioning the ingredients employed in the production of mortar, cement, silicate bricks, tiles and the like. In this class of machinery, it is common to mix and grind together a certain proportion of the ingredients and thereafter to mix further material therewith, but I have found from practical experience, that while absolutely predetermined proportions of the ingredients are uniformly fed to the grinding mill, and a uniform proportion of the material is constantly fed to the product as it is discharged from the mill, the discharge from the mill is not uniform and hence the proper proportion between the material fed from the mill and the material mixed therewith is not maintained, and the object of my present invention is to provide a means for producing a uniform proportion of the ingredients at this point, and hence a uniform mixture. I attain this object by employing a measuring device for the material discharged from the mill, whereby the material is accurately measured and fed forward in uniform predetermined quantities, the additional material being then added thereto also in uniform predetermined quantities.

In order that my invention may be fully understood, I will now proceed to describe an apparatus constituting an embodiment thereof, having reference to the accompanying drawings illustrating the same, and will then point out the novel features in claims.

In the drawings: Figure 1 is a diagrammatic view of the apparatus showing the same partly in side elevation and partly in vertical section. Fig. 2 is a view in transverse section through a measuring device employed. Fig. 3 is a view in longitudinal section therethrough.

For the purpose of simplicity of description, I will describe this apparatus as employed for mixing, measuring and feeding lime and sand in the manufacture of mortar, silicate bricks, tiles and the like, but it will, of course, be understood that this is intended in no sense as a limitation upon the use of the apparatus.

The apparatus shown comprises a conveyer 1 for lime, a measuring device 2 for regulating the delivery thereof, a mixer 3 for receiving the lime, a conveyer measuring device 4 for conveying and delivering a uniform quantity of sand to the mixer, whereby predetermined proportions of the sand and the lime will be mixed together in the mixer 3, and a grinding mill 5 for receiving the mixed materials. The grinding mill may be of any suitable character, such for instance as the device known as a tube mill which is commonly employed for this purpose, the said tube mill containing pebbles which are tumbled in the rotation of the mill, and which act upon the sand and lime to grind the same to a fine powder, and to further and completely mix the two ingredients together. The product from the tube mill is delivered to a conveyer 6 by which it is conveyed and delivered to a collector and measuring device 7. This device is designed to feed an absolutely uniform quantity of the material to the conveyer 8 regardless of the variable quantities delivered from the tube mill 5. A simple form of such device is shown in Figs. 2 and 3, the same comprising a cylindrical casing 13, and a rotatable wheel 14 fitted thereto, the said wheel having peripheral recesses or pockets 15, and the upper portion of the casing connecting with the lower end of the collecting vessel 16 while the lower end thereof discharges to the conveyer 8. While a varying amount of the product from the mill 5 may be received in the collector 16, sometimes more and sometimes less in a given period of time, the pockets or recesses 15 in the wheel 14, will, in the rotation of the wheel, constitute accurate measuring means, whereby the product fed forward from this point will be so fed with absolute regularity. The conveyer 8 delivers this product to a mixer 9, the said mixer being also designed to receive a uniform quantity of sand or other material from a conveying or measuring device 12. The materials are mixed in the mixer 9 and delivered to a wet mixer 10 in which water is applied and thoroughly mixed therewith, and from which the product is delivered to a silo and storage vessel 11.

The various portions of this apparatus are shown somewhat diagrammatically in the drawings because each of them in itself is an old and well known structure and the particular form thereof is immaterial. The conveying and measuring devices 4 and 10 are shown as simple forms of belt conveyers, which being loaded to a uniform degree and run at a uniform rate of speed carry forward a uniform quantity of the material. Similarly the collecting vessel and measuring devices 2 and 7 may comprise any convenient and suitable mechanism for measuring and feeding a uniform quantity of the material received thereby, one simple form of such measuring device being shown in Figs. 2 and 3 as aforesaid.

It will be well understood that the apparatus just described is particularly adapted for the mixing of sand and lime for the purpose specified. Say for example, that it is desired to mix 5% of lime with 95% of sand. It is usual and desirable to first mix a certain proportion, say 25% of the sand with all of the lime and grind the same together so that some exceedingly fine sand is mixed with the lime; and to thereafter mix with the ground sand and lime the remaining 75% of the sand in an unground condition. This has been attempted heretofore, but as the product of the grinding mill varies very greatly in spite of the fact that an absolutely uniform quantity of material is constantly fed thereto, the result has been a constant variation in the relative proportions of the final mixture.

What I claim is.

1. The combination with a grinding mill, a mixer discharging thereinto, and a plurality of measuring devices for supplying predetermined quantities of unlike materials to the mixer, of a collector, means for conveying the irregularly discharged product of the grinding mill to the collector, a receiver, means for continuously conveying a uniform amount of the ground mixture from the collector to the receiver and means for simultaneously and continuously conveying a predetermined uniform amount of an unlike material to the collector.

2. The combination with a grinding mill, a mixer discharging thereinto, and a plurality of measuring devices for supplying predetermined quantities of unlike materials to the mixer, of a collector, means for conveying the irregularly discharged product of the grinding mill to the collector, a second mixer, means for continuously conveying a uniform amount of the ground mixture from the collector to the second mixer and means for simultaneously and continuously conveying a predetermined uniform amount of an unlike material to the second mixer whereby a uniform final mixture is produced.

SIGURD WIEBE.

Witnesses:
W. H. H. OSBORNE,
JOHN HEIMLECH.